United States Patent Office 3,379,792
Patented Apr. 23, 1968

3,379,792
POLYMER BLEND OF A POLYPHENYLENE
OXIDE AND A POLYAMIDE
Robert W. Finholt, Riverside, Conn., assignor to General
Electric Company, a corporation of New York
No Drawing. Filed Aug. 12, 1965, Ser. No. 479,330
9 Claims. (Cl. 260—857)

ABSTRACT OF THE DISCLOSURE

A polymer blend consisting of a polyphenylene oxide and from 0.1 to 25%, by weight, of a polyamide. The addition of the polyamide improves the flow properties of the polyphenylene oxide.

---

This invention relates to polymer blends of a polyphenylene oxide and a polyamide.

The polyphenylene oxides are disclosed and claimed in U.S. Patents Numbers 3,306,874 and 3,306,875 of Allan S. Hay, filed concurrently July 24, 1962, and incorporated herein by reference. They are characterized by a unique combination of chemical, physical and electrical properties over a temperature range of more than 600° F. extending from a brittle point of −275° F. to a heat distortion temperature of 375° F. This combination of properties renders the polyphenylene oxides useful for many commercial applications; however, their use has been somewhat restricted because the polymer possesses poor flow properties that cause difficulties during extrusion operations.

I have now unexpectedly found, however, that the flow properties of the polyphenylene oxides can be greatly improved by the addition of a polyamide to a polyphenylene oxide. This is particularly surprising inasmuch as polyamides are relatively insoluble in the polyphenylene oxides and would not be expected to impart a plasticization effect.

Another object of this invention is to provide a polyphenylene oxide composition having excellent flow properties.

The polyphenylene oxides described in the above-noted patents of Hay are formed by reacting a monovalent phenol with oxygen in the presence of a copper-amine complex catalyst. They may be represented by the following general formula:

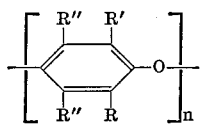

wherein the oxygen atom of one unit is connected to the benzene nucleus of the next adjoining unit, $n$ is a positive integer and is at least 100, R is a monovalent substituent selected from the group consisting of hydrogen, hydrocarbon radicals free of a tertiary alpha-carbon atom, and halohydrocarbon radicals having at least two carbon atoms between the halogen atom and phenol nucleus and being free of a tertiary alpha-carbon atom, hydrocarbonoxy radicals being free of a tertiary alpha-carbon atom, and halohydrocarbonoxy radicals having at least two carbon atoms between the halogen atom and phenol nucleus and being free of a tertiary alpha-carbon atom, R' and R" are both monovalent substituents which are the same as R and in addition, halogen.

For brevity, the term "polyphenylene oxide" as used throughout this specification will include not only unsubstituted polyphenylene oxide (made from phenol) but also polyphenylene oxides substituted with various substituents (e.g., those for which R, R' and R" stand above).

The term "polyamides" as used throughout this specification is meant to include those polymers formed from the condensation of diamines and dibasic acids and the self-condensation of amino acids as well as those formed by the polymerization of lactams. The manner of forming the polyamides is well known in the art. Details concerning their formation are set forth in "Polyamides," Donald E. Floyd, Reinhold Publishing Corporation, 1958. The polyamides suitable for purposes of the present invention are those which melt at a temperature in excess of 350° F. and the preferred polyamides are those melting between 375° F. and 550° F. Preferred polyamides include polyhexamethylene adipamide, polycaprolactam, polyhexamethylene sebacamide, and copolymers thereof.

In general, the flow properties of the polyphenylene oxides are improved with additions of polyamide of from 0.1 to 25 percent, by weight, of the total composition. It has been found, however, that when the concentration of the polyamide exceeds 20 percent, appreciable losses in other physical properties begin to occur. When the concentration of the polyamide is less than 1 percent, the flow properties of the polyphenylene oxide are only slightly improved. Accordingly, in a preferred embodiment, the polyamide constitutes from 1 to 20 percent of the polymer blend and the polyphenylene oxide constitutes the remainder.

The method used to form the blend is not critical provided the polyamide is homogeneously dispersed throughout the polyphenylene oxide. Incomplete mixing results in the formation of aggregates which impair the physical properties of the blend. The blend may be formed by mixing the two polymers in granular or powder form in a mixing apparatus followed by molding or extrusion. Another convenient method comprises dissolving the two polymers in a solvent in which they are both soluble and co-precipitating the polymers as a homogeneous mixture.

In general, when forming the mixture by extrusion, the two polymers, in granular or powder form, are first mixed by tumbling. A fine powder is preferred as this increases the degree of homogeneity. The mixture of polymers is fed to the hopper of an extruder and passed through the die at a temperature ranging between 500 and 650° F. In order to insure complete dispersion, it is desirable to pelletize the extruded strand in a strand chopper and re-extrude under the same extrusion conditions.

The addition of a polyamide to a polyphenylene oxide greatly increases the flow properties of the polyphenylene oxide. For example, a sample of a poly-(2,6-dimethyl-1,4-phenylene-oxide) extruded at a temperature of 600° F. developed a pressure before the die of approximately 2500 to 3000 p.s.i. With addition of only 1 percent polyhexamethylene adipamide, the extrusion pressure was reduced by more than 500 p.s.i. With addition of 10 percent polycaprolactam, the pressure developed before the die was reduced to approximately 1000 p.s.i.

Improving the flow properties of the polyphenylene oxides permits extrusion of tubes, rods, pipes, and other profiles. Thus, by the addition of a polyamide to a polyphenylene oxide, the utility of the polyphenylene oxides is greatly increased.

The following examples are illustrative of the various aspects of the present invention, but are not to be construed as limiting. All percentages expressed in the examples are by weight.

Example 1

The polyphenylene oxide component was a poly-(2,6-dimethyl-1,4-phenylene-oxide) having an intrinsic viscosity of approximately 0.60 dl./g. (deciliters per gram) as measured in chloroform at 30° C. The polyamide was a polyhexamethylene adipamide obtained from E. I.

DuPont de Nemours & Company, Inc. and identified as "Zytel" 101. Two polyblends and a control sample were prepared. The blends contained 0.1 percent and 1 percent polyamide, respectively. The components, in fine powder form, were mixed in a Banbury mixer and passed through an extruder maintained at approximately 560° F. at a screw speed of 23.5 r.p.m. The extrusion die was a 1" ribbon die 60 mils in width. A pressure gauge was placed directly before the die in order to measure the pressure developed through the die. The following extrusion pressures were recorded:

Adipamide blend

| Composition (wt. percent polyamide): | Pressure p.s.i. (average) |
|---|---|
| 0 | 2750 |
| 0.1 | 2425 |
| 1.0 | 2400 |

From the above, it can be seen that extrusion pressure ribbons and tensile properties were determined using the procedure set forth in ASTM D638–61T. The polyphenylene oxide sample free of polyamide was found to have a yield strength of 9800 p.s.i. and a rupture strength of 7400 p.s.i. This compared with a yield strength of 9500 p.s.i. and a rupture strength of 7000 p.s.i. for the sample containing 0.1 percent polyamide and a yield strength of 9800 p.s.i. and a rupture strength of 7600 p.s.i. for the sample containing 1.0 percent polyamide.

Example 2

Using the equipment and procedures of Example 1, three additional blends were prepared. The components of the blends consisted of a poly-(2,6-dimethyl-1,4-phenylene-oxide) having an intrinsic viscosity of approximately 0.60 dl./g. as measured in chloroform at 30° C. and a polycaprolactam obtained from E. I. DuPont de Nemours & Company, Inc. identified as "Zytel" 211. The polyblends contained 0, 10 and 20 percent polyamide, respectively. The extrusion temperature was approximately 558° F. and the screw speed was 23.5 r.p.m. The results obtained are set forth below:

| Composition (Wt. Percent Polyamide) | Extrusion Pressure, p.s.i. (Averaged) | Yield Strength, p.s.i. | Rupture, Strength, p.s.i. |
|---|---|---|---|
| 0 | 2,750 | 9,800 | 7,400 |
| 10 | 1,000 | 8,300 | 8,300 |
| 20 | 600 | 7,900 | 7,900 |

Example 3

Example 2 was repeated, but the screw speed of the extruder was increased to 50 r.p.m. The pressure developed before the die for the sample free of polyamide was again found to be 2750 p.s.i. The pressure for the sample containing 10 percent polyamide was found to be 2050 p.s.i. and that containing 20 percent polyamide was found to be 950 p.s.i.

Example 4

Example 2 was repeated, but pellets of the polyamide were substituted for powder. The sample containing 10 percent polyamide pellets developed an extrusion pressure of 1000 p.s.i. and that containing 20 percent developed a pressure of 400 p.s.i. The control sample free of polyamide developed a pressure of 2750 p.s.i.

Example 5

Example 4 was repeated but the screw speed of the extruder was increased to 50 r.p.m. The extrusion pressure for the polyblends containing 0, 10 and 20 percent polyamide were found to be 2750 p.s.i., 1900 p.s.i., and 750 p.s.i., respectively.

It should, of course, be apparent to those skilled in the art that changes may be made in the particular embodiments of the invention described which are within the full intent and scope of the invention as defined by the appended claims. For example, the polyblend may contain additional polymers, such as polystyrenes, polyolefins, etc. In addition, plasticzers may be added to the polyblend to further increase flow properties. Mineral oil has been found to be a particularly suitable plasticizer for the composition.

What I claim as new and desire to secure by Letters Patent of the United States is:

1. A resin composition consisting of
   (a) a polyphenylene oxide having the structural formula:

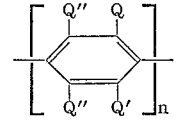

wherein the oxygen ether atom of one unit is connected to the benzene nucleus of the next adjoining unit, $n$ is a positive integer of at least 100, Q is a monovalent substituent selected from the group consisting of hydrogen, hydrocarbon radicals free of a tertiary alpha-carbon atom, halohydrocarbon radicals having at least two carbon atoms between the halogen atom and phenol nucleus and being free of a tertiary alpha-carbon atom, hydroxycarbonoxy radicals being free of a tertiary alpha-carbon atom, and halohydrocarbonoxy radicals having at least two carbon atoms between the halogen atom and phenol nucleus and being free of a tertiary alpha-carbon atom; and Q' and Q" are both monovalent substituents which are the same as Q and in addition halogen; and
   (b) from 0.1 to 25 percent, by weight of the total composition, of a polyamide having repeating carbonamide groups in the polymer chain.

2. The resin composition of claim 1 wherein the polyamide constitutes from 1 to 20 percent, by weight of the total composition.

3. The resin composition of claim 2 wherein the polyamide has a melting point in excess of 350° F.

4. The resin composition of claim 2 wherein the polyamide has a melting point of from 375° F. to 550° F.

5. The resin composition of claim 1 wherein Q and Q' are methyl and Q" is hydrogen.

6. The resin composition of claim 1 wherein the polyamide is a polyhexamethylene adipamide.

7. The resin composition of claim 1 wherein the polyamide is a polycaprolactam.

8. The resin composition of claim 1 wherein the polyphenylene oxide is poly-(2,6-dimethyl-1,4-phenylene-oxide) and the polyamide is polyhexamethylene adipate.

9. The resin composition of claim 1 wherein the polyphenylene oxide is poly-(2,6-dimethyl-1,4-phenylene-oxide) and the polyamide is polycaprolactam.

No references cited.

MURRAY TILLMAN, *Primary Examiner.*

PAUL LIEBERMAN, *Assistant Examiner.*